United States Patent [19]

Tsuchiya et al.

[11] Patent Number: 4,689,782
[45] Date of Patent: Aug. 25, 1987

[54] RECORDING DISK CENTERING AND CLAMPING APPARATUS

[75] Inventors: Isamu Tsuchiya, Oume; Kiyoshi Hirasawa, Hino, both of Japan

[73] Assignee: Teac Corporation, Tokyo, Japan

[21] Appl. No.: 774,322

[22] Filed: Sep. 10, 1985

[30] Foreign Application Priority Data

Sep. 10, 1985 [JP] Japan .............................. 59-136951[U]

[51] Int. Cl.⁴ .............................................. G11B 25/04
[52] U.S. Cl. .................................................... 369/270
[58] Field of Search ................................ 369/270, 271

[56] References Cited

U.S. PATENT DOCUMENTS

| 3,768,815 | 10/1973 | Mathurin | 346/137 |
| 4,125,883 | 11/1978 | Rolph | 360/99 |
| 4,408,318 | 10/1983 | Sugiura | 369/270 |
| 4,484,321 | 11/1984 | Eisemann | 369/270 |
| 4,514,839 | 4/1985 | Eisemann | 369/270 |

FOREIGN PATENT DOCUMENTS

| 58-22318 | 5/1983 | Japan . | |
| 59-127280 | 7/1984 | Japan | 369/258 |

Primary Examiner—Steven L. Stephan
Attorney, Agent, or Firm—Woodcock Washburn Kurtz Mackiewicz & Norris

[57] ABSTRACT

A motor driven hub has a socket defined concentrically therein, with an annular disk bearing surface left around the socket for supporting a flexible magnetic disk. Movable into and out of engagement with the hub is a rotatable clamp having a central body portion and a plurality of clamp segments extending radially outwardly therefrom. The clamp segments have centering portions to fit in the hub socket through the central hole in the magnetic disk for centering same, and clamping portions for clamping the disk against the disk bearing surface of the hub. Each clamp segment further includes a deflectable bridge portion joining the associated centering and clamping portions to the body portion, so that the centering and clamping portions of all the clamp segments are individually resiliently displaceable for firmly clamping the magnetic disk. Each deflectable bridge portion is arcuate in shape, as seen in a radial plane of the clamp, and thus is compactly disposed between the body portion and the centering and clamping portions for resiliently supporting the latter without adding to the axial dimension of the clamp.

6 Claims, 7 Drawing Figures

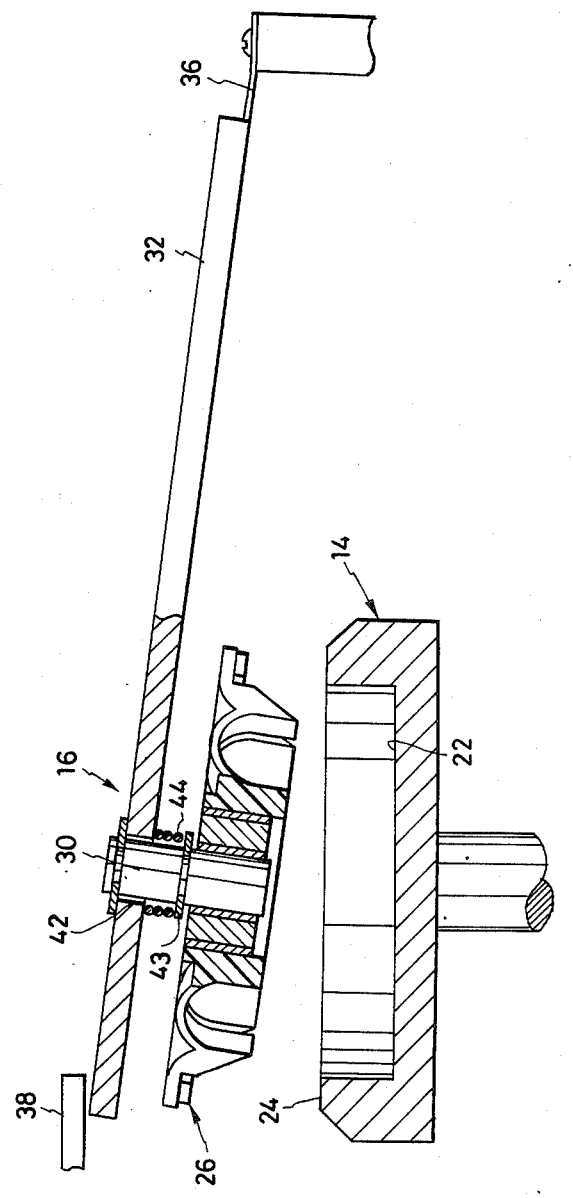

RECORDING DISK CENTERING AND CLAMPING APPARATUS

BACKGROUND OF THE INVENTION

Our invention relates to an apparatus, generally known as a disk drive, for reading and/or writing data on a recording disk such as a flexible magnetic disk, or a floppy disk according to common parlance. More specifically, our invention pertains to an apparatus in such a disk drive for centering and clamping the recording disk in a preassigned position for data transfer with a transducer head assembly or a pair of such assemblies.

We are aware of several devices heretofore suggested and used for centering and clamping a flexible magnetic disk in a disk drive. Generally, such devices comprise a clamp in the form of a tapered collet which is both rotatable and movaoble into and out of engagement with a socketed drive hub rigidly mounted on a motor driven shaft. U.S. Pat. No. 3,768,815 to Mathurin teaches the radial splitting of the collet into several segments. The collet segments are wedged apart against the inner wall of the drive hub defining the socket, in order that the magnetic disk may be positively arrested between collet and hub in axial alignment therewith. However, the use of the wedging means, as well as of the clamp and release springs associated with the collet, according to Mathurin makes his apparatus expensive in construction and difficult of assemblage.

An obvious remedy for these weaknesses of Mathurin's apparatus might be to make the maximum diameter of the tapered, segmented collet greater than the diameter of the socket in the drive hub, as disclosed in Japanese Utility Model Publication No. 58-22318 (laid open to public inspection on Dec. 18, 1978). The collet will then pressfit in the socket in the drive hub to firmly clamp the magnetic disk therebetween without the aid of the wedging means that complicate the clamping mechanism.

The two foregoing known devices have a problem in common, however. The problem arises from the fact that the annular disk bearing surface of the drive hub, the substantially annular disk clamping surface of the collet, and the magnetic disk to be clamped therebetween are all not necessarily absolutely flat. In such cases the magnetic disk cannot possibly be clamped firmly enough unless the collet segments are individually resiliently supported.

The concept of resiliently supporting the individual collet segments is not new but has been suggested by Rolph U.S. Pat. No. 4,125,883. Rolph teaches to join the collet segments to the central body of the collet via respective resiliently deflectable fingers. These fingers are set at an angle to the axis of the collet, as well as to a plane normal to the collet axis, in order to give a sufficient amount of deflection. We object to this angular finger arrangement as it adds to the axial dimension of the collet and, in consequence, of the dimension of the complete disk drive in the same direction. It may be contemplated, as an alternative to the noted finger configuration, to dispose the fingers on a plane perpendicular to the collet axis and to make them sufficiently thin to afford a required degree of deflection. This alternative is unsatisfactory, however, as such thin fingers would be easy to break.

SUMMARY OF THE INVENTION

We have hereby found out how to correctly center and positively clamp a recording disk such as a flexible mgnetic disk in a disk drive without adding to the axial dimension of the clamping means and without any sacrifice in strength or durability.

Our invention may be briefly summarized as an apparatus for centering and clalmping a recording disk, comprising a drive hub rotatable about a first axis and having a socket defined concentrically therein. The drive hub is further adapted to provide an annular disk bearing surface around the socket for bearing the recording disk thereon. Movable into and out of engagement with the drive hub is a clamp rotatable about a second axis which is in alignment with the first axis at least when the clamp is engaged with the drive hub. The clamp comprises a body portion centered about the second axis, and a plurality of clamp segments extending radially outwardly from the body portion and terminating in centering and clamping means coacting with the drive hub for centering the recording disk with respect to the drive hub and clamp, and for clamping the recording disk against the disk bearing surface of the rive hub, when the clamp is moved into engagement with the rive hub via the intervening recording disk. Each clamp segment further includes a deflectable bridge portion joining the associated centering and clamping means to the body portion. Each deflectable bridge portion is arched in shape as seen in a radial plane of the clamp, so that the centering and clamping means of the clamp segments are individually resiliently displaceable relative to the body portion ofr firmly clamping the recording disk against the disk bearing surface of the drive hub. Also included are means for moving the clamp into and out of engagement with the drive hub for clamping and unclamping the recording disk.

The centering and clamping means of each clamp segment can be of the known configuration comprising a centering portion adapted to fit in the socket in the drive hub through the central hole in the recording disk so as to center the latter, and a clamping portion extending from the centering portion radially outwardly of the clamp for clamping the centered disk against the disk bearing surface of the drive hub. All the centering portions and all the clamping portions of the clamp are of annular arrangement about the clamp axis and are joined to its body portion via the respective deflectable bridge portions.

Being arcuate in shape, the deflectable bridge portions in accordance with our invention allow relatively large resilient displacement of the individual centering and clamping portions even if the bridge portions are made sufficiently thick to avoid breakage in use. The arcuate shape of the deflectable bridge portions also make it possible to compactly dispose these portions between the body portion and the centering and clamping portions and, nevertheless, to make the bridge portions long enough to give a required degree of deflection. The axial dimension of the clamping apparatus may therefore be reduced to a minimum despite the fact that the centering and clamping portions are resiliently supported individually.

The above and other features and advantages of our invention and the manner of realizing them will become more apparent, and the invention itself will best be understood, from a study of the following description

BRIEF DESCRIPTION OF THE DRAWINGS

FIG. 2 is an axial section through the disk centering and clamping apparatus of FIG. 1, shown in its unclamping state;

DESCRIPTION OF THE PREFERRED EMBODIMENT

General

Figure 1:
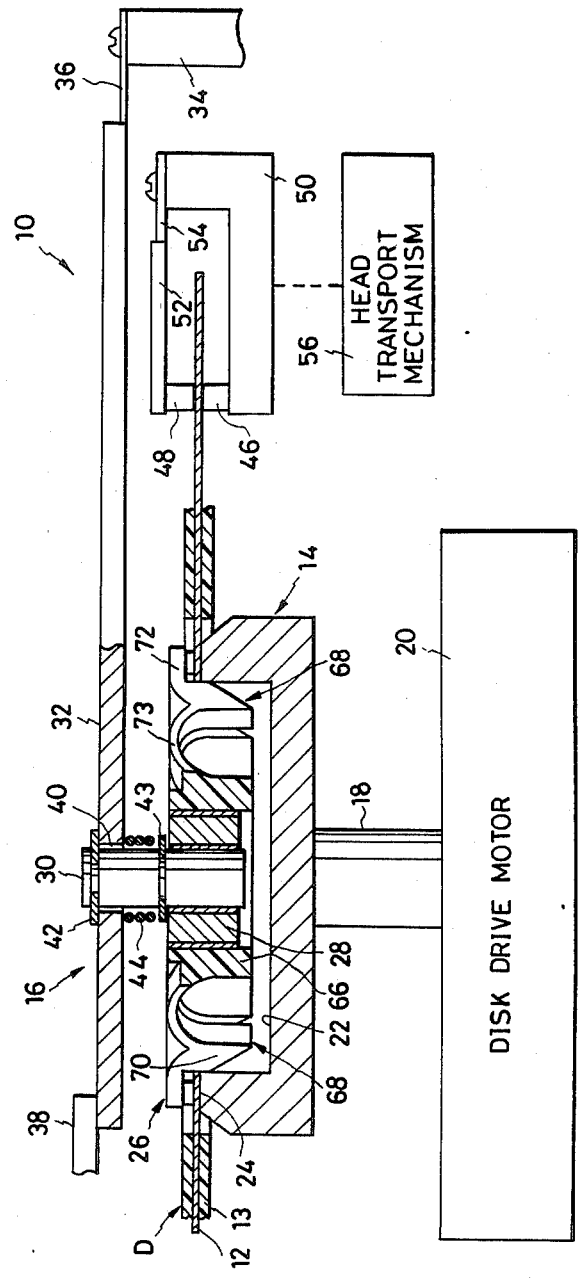
FIG. 1 is a diagrammatic elevation, partly sectioned for clarity, of some essential parts of a flexible magnetic disk drive incorporating the disk centering and clamping apparatus of our invention, shown together with the flexible magnetic disk clamped in position therein.
Figure 6:
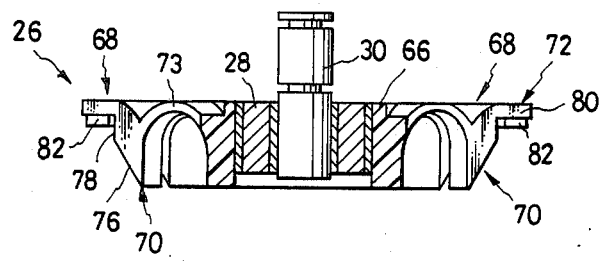
FIG. 6 is an axial section through the clamp of FIGS. 4 and 5, taken along the line VI—VI in FIG. 5.
Figure 7:
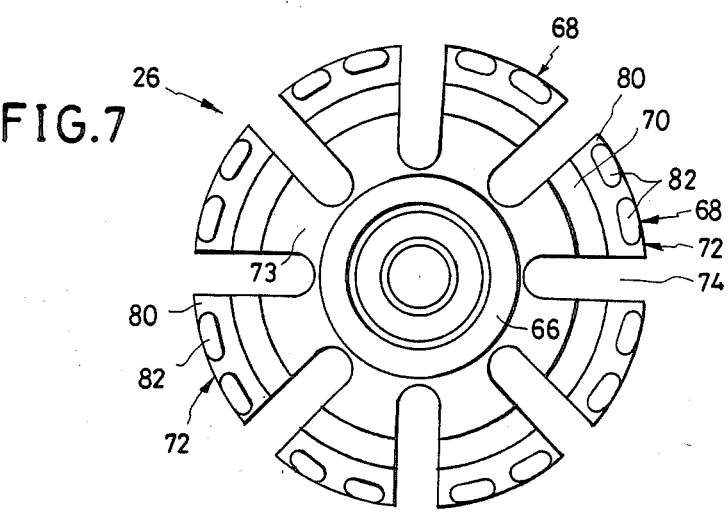
FIG. 7 is a bottom plan of the clamp of FIGS. 4 through 6.

We will first describe the general organization of the disk drive incorporating the improved disk centering and clamping mechanism in accordance with our invention, only to an extent necessary for a full undertanding of the invention. Generally designated 10 in FIG. 1, the disk drie is therein shown adapted for use with a double sided flexible magnetic disk 12. The magnetic disk 12 is rotatably housed in a protective envelope 13 to make up a disk cartridge D which is to be detailed subsequently. The disk drive 10 has a dribe hub 14 forming a part of the disk centering and clamping mechanism 16 for clamping the magnetic disk 12 in a preassigned data transfer position as shown in FIG. 1. The drive hub 14 is herein shown mounted directly on an output shaft 18 of an electric disk drive motor 20 for joint rotation therewith. A socket 22 is defined concentrically in the top face of the drive hub 14, with an annular disk bearing surface 24 left around the socket.

Another important component of the disk centering and clamping mechanism 16 is a clamp or collet 26 rotatably mounted via a bushing 28 on a shaft 30. This shaft 30 is mounted in turn on a distal end of a clamp arm 32 proximally pivoted on a fixed support 34 via a cantilever spring 36. Thus the clamp 26 is movable between a clamping position of FIG. 1, where the clamp engages with the drive hub 14 for clamping the magnetic disk 12 therebetween, and an unclamping position of FIG. 2 where the clamp disengages the magnetic disk. The cantilever spring 36 biasses the clamp arm 32 from the clamping toward the unclamping position. Forming a part of the known clamp actuating mechanism, a clamp actuating member 38 operates to move the clamp arm 32 from the unclamping to the clamping position against the force of the cantilever spring 36. The axis of rotation of the clamp 26 on the clamp arm 32 is in alignment with that of the drive hub 14 when the clamp is in the clamping position. The clamp 26 is therefore rotatable with the drive hub 14 when engaged therewith, as well as with the magnetic disk 12 clamped therebetween.

The shaft 30 rotatably carrying the clamp 26 is slidably engaged in a hole 40 in the clamp arm 32 so as to partly protrude upwardly therefrom. A collar 42 is fixedly mounted on this protruding end of the shaft 30, and another collar 43 is fixedly mounted on the shaft 30 in a position spaced downwardly from the clamp arm 32. A helical compression spring 44 is sleeved upon the shaft 30 so as to intervene between clamp arm 32 and lower collar 43. Accordingly, the shaft 30 together with the clamp 26 thereon is sprung downwardly of the clamp arm 32, or toward the drive hub 14, and is resiliently displaceable toward the clamp arm at the time of the engagement of the clamp with the drive hub.

FIG. 1 also shows a pair of magnetic transducer head assemblies 46 adn 48 disposed on the opposite sides of the magnetic disk 12 for data transfer with its opposite faces. The lower head assembly 46 is mountd directly on a carriage 50, whereas the upper head assembly 48 is mounted on a load arm 52, pivoted on the carriage 50 via a cantilever spring 54. The upper head assembly 48 is movable into and out of forced contact with the lower head assembly 46 via the magnetic disk 12. The carriage 50 is coupled to a head transport mechanism of any known or suitable design, shown in block form designated 56, thereby to be reciprocably and incrementally transported radially of the magnetic disk 12 to enable the head assemblies 46 and 48 to access the individual tracks of information on the magnetic disk 12. The head transport mechanism usually comprises an electrical stepping motor coupled to the carriage 50 via a rotary to linear converter such as a lead screw or a rack and pinion arrangement.

FLEXIBLE MAGNETIC DISK CARTRIDGE

Figure 3:
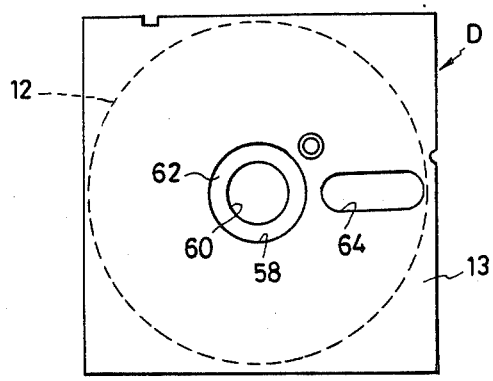
FIG. 3 is a plan view of a double sided flexible magnetic disk cartridge for use with the disk drive of FIG. 1.
Figure 4:
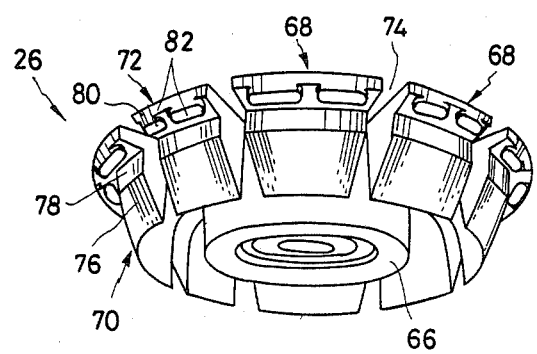
FIG. 4 is a perspective view of the segmented clamp of the disk centering and clamping apparatus of FIGS. 1 and 2.
Figure 5:
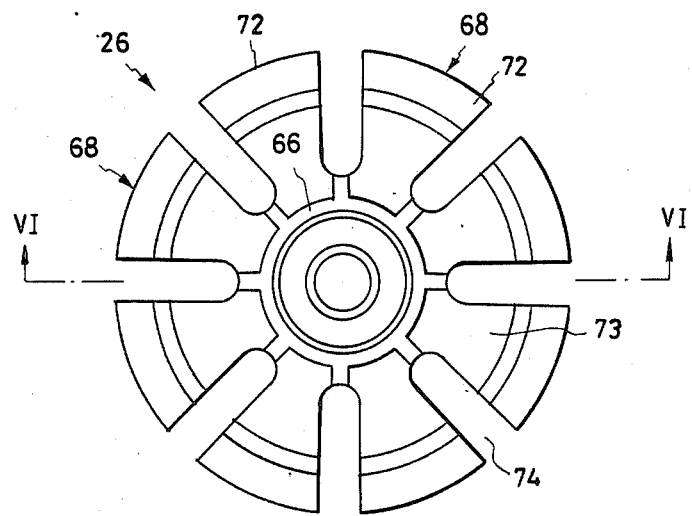
FIG. 5 is a top plan of the clamp of FIG. 4.

We have illustrated in FIG. 3 the disk cartridge D for use with the disk drive 10 of FIG. 1. The disk cartrige D has the flexible magnetic disk 12 which is rotatably housed as aforesaid in the protective envelope 13. This envelope has formed in each of its opposite sides a central aperture 58 larger than a concentric central hole 60 in the magnetic disk 12 to expose its annular portion 62 around the hole 60. Also formed in each side of the envelope 13 is a slot 64 to expose a radial portion of the magnetic disk 12 for data transfer contact with one of the transducer head assemblies 46 and 48.

CLAMP

We will now proceed to a detailed study of the clamp 26, one of the components of the disk centering and clamping mechanism 16, forming the gist of our invention. As illustrated in detail in FIGS. 4 through 7, the clamp 26 can be a plastic molding integrally comprising a central body portion 66 coaxially sleeved upon the shaft 30 via the bushing 28, and a plurality of, eight in the illustrated embodiment, clamp segments 68 extending radially outwardly from the body portion 66. Each clamp segment 68 comprises a centering portion 70 adapted to fit in the socket 22 in the drive hub 14 through the central hole 60 in the magnetic disk 12, a clamping portion 72 for clamping the exposed annular portion 62 of the magnetic disk against the disk bearing surface 24 of the drive hub, and an arcuate, deflectable bridge portion 73 resiliently joining the centering and clamping portios to the body portion 66. All the centering portions 70 and all the clamping portions 72 of the clamp 26 are of annular arrangement about the clamp axis, concentrically surrounding the body portion 66. Thus, as a whole, the clamp 26 takes the form of a tapered collet having radial slots 74 cut therein at constant angular spacings to define the clamp segments 68.

Generally extending parallel to the axis of the clamp 26 in parallel spaced relation to its body portion 66, each centering portion 70 has a sloping outer surface 76, closer to the drive hub 14, and a nonsloping outer surface 78 disposed farther away from the drive hub. The sloping surfaces 76 of all the clamp segments 68 conjointly serve to taper the lower end portion, directed toward the drive hub 14, of the clamp 26 for the ease of engagement in the socket 22 in the drive hub 14 through the central hole 60 in the magnetic disk 12. The nonsloping surfaces 78 of all the clamp segments 68 form in combination a cylindrical surface for centering the magnetic disk 12 with respect to the drive hub 14 and clamp 26 by being relatively closely received in the central hole 60 in the disk upon full engagement of the clamp with the drive hub.

The clamping portion 72 of each clamp segment 68 comprises a tab 80 extending radially outwardly from the top end, directed away from the drive hub 14, of the associated centering portion 70. Each tab 80 has one or more, two in the illustrated embodiment, protuberances 82 formed on its underside for pressing the exposed annular portion 62, FIG. 3, of the magnetic disk 12 against the disk bearing surface 24, FIGS. 1 and 2, of the drive hub 14. The tabs 80 of all the clamp segments 68 form in combination a flange around the collet, coming into register with the disk bearing surface 24 of the drive hub 14 upon engagement of the clamp with the drive hub as shown in FIG. 1.

The deflectable bridge portion 73 of each clamp segment 68 extends between the top end of the associated centering portion 70 and the top end of the body portion 66, or between those ends of the centering and body portions which are away from the drive hub 14. Further, as seen in a radial plane of the clamp 26 as in FIG. 6, each deflectable bridge portion 73 is arched in shape. Thus, although compactly disposed between body portion 66 and centering portion 70, each deflectable bridge portion 73 has a sufficient length to afford a required degree of deflection even if the bridge portion is made thick enough to resist breakage or warpage in use.

OPERATION

We will now explain a preferred mode of operation of the disk drive 10, and particularly of its disk centering and clamping apparatus 16. The various parts and components of the disk drive 10 shown in FIG. 1 are all mounted in a housing, not shown, of conentional make having an entrance slot which is directed to the left in FIGS. 1 and 2. The flexible magnetic disk cartridge D to be clamped for data transfer with the pair of transducer head assemblies 46 and 48 may be loaded in the disk drive 10 through this entrance slot while the clamp arm 32 is in the unclamping position of FIG. 2. The magnetic disk 12 will become approximately concentric with the drive hub 14 upon full insertion of the disk cartridge D in the entnrance slot. Then the disk drive motor 20 may be set into rotation with the drive hub 14, and at the same time the clamp arm 32 may be pivoted by the clamp actuating member 38 from the unclamping position of FIG. 2 to the clamping position of FIG. 1. The centering portions 70 of the clamp 26 on the clamp arm 32 will then become engaged in the socket 22 in the revolving drive hub 14 through the central hole 60 in the magnetic disk 12. Being in rotation with the drive hub 14, the magnetic disk 12 will be centered with respect to the drive hub and clamp 26 as the sloping surfaces 76 and then the nonsloping surfaces 78 are successively received in the drive hub socket 22 through the disk hole 60.

Upon completion of the pivotal motion of the clamp arm 32 to the clamping position, the clamping portions 72 of the clamp 26, comprising the tabs 80 with the downward protuberances 82, will press the exposed annular portion 62 of the magnetic disk 12 against the disk bearing surface 24 of the drive hub 14. The magnetic disk 12 has now been clamped in position between drive hub 14 and clamp 26.

We assume that the clamp actuating member 38 is adapted to depress the clamp arm 32 to such an extent that the clamping portions 72 of the clamp 26 hold the exposed annular portion 62 os the magnetic disk 12 against the disk bearing surface 24 of the drive hub 14 under sufficiently high pressure to firmly clamp the disk in the face of the possible unevenness of the disk bearing surface 24 and the magnetic disk. If the disk bearing surface 24 and/or the magnetic disk 12 is not exactly flat, the clamping portions 72 of some of the collet segments 68 will first come into engagement with the disk bearing surface via the magnetic disk. Then, with the continued descent of the clamp 26, the bridge portions 73 of such collet segments will deflect to allow the clamping portions 72 of the other collet segments to come into contact with the drive hub 14 via the magnetic disk 12. Thus the magnetic disk 12 will be firmly pressed against the drive hub 14 by all, or at least nearly all, of the clamp segments 58.

It is particularly noteworthy in connection with the improved disk centering and clamping mechanism 16 of our invention that the required deflections of the bridge portions 73 are attained largely by their arcute shape. Accordingly, these bridge portions need not be made so slender as to suffer breakage or warpage in use. Nor is it necessary to make the bridge portions protrude beyond the upper or lower extremity of the body portion 66 of the clamp 26 for increasing their length.

It will also be appreciated that the bridge portions 73 join the top ends, instead of the bottom ends, of the body portions 66 and the centering portions 70 and, consequently, are approximately in coplanar relation to the tabs 80 of the clamping portions 72. This arrangement of the bridge portions 73 make it possible for the clamping tabs 80 with their protuberances 82 to be resiliently displaced about the fulcrums located in coplanar relation thereto. Thus, despite the deflections of the bridge portions 73, the clamping tabs 80 remain more or less parallel to the magnetic disk 12 for positively clamping same against the drive hub 14.

Notwithstanding the foregoing detailed disclosure, we do not wish our invention to be limited by the exact details of the illustrated embodiment, as a variety of modifications or alterations of the embodiment will occur to one skilled in the art within the broad teaching hereof. For example, the centering portions 70 of the clamp segments 68 may have a maximum diameter slightly more than the diameter of the socket 22 in the drive hub 14, so that the centering portions may pressfit int he socket. Further the clamp 26 may not necessarily be mounted to the pivotal clamp arm as in the above disclosed embodiment but may be made movable axially into and out of engagement with the drive hub 14. It will also be apparent that the centering and clamping mechansim 16 can operate in the intended manner if the disk drive motor 20 is held out of rotation during the centering and clamping of the magnetic disk 12.

We claim:

1. An apparatus for centering and clamping a recording disk in a disk drive, comprising:
   (a) a drive hub mountd to the disk drive for rotation about a first axis and having a socket defined concentrically therein, the drive hub being further adapted to provide an annular disk bearing surface around the socket for direct contact with an annular portion of the recording disk around a central hole defined therein;
   (b) a clamp mounted to the disk drive for movement into and out of engagement with the drive hub and being rotatable about a second axis at least when the clamp is engaged with the rive hub, the clamp comprising a body portion centered abut the second axis, and a plurality of clamp segments extending radially outwardly of the body portion and each terminating in a centering portion to be engaged in the socket in the drive hub through the central hole in the recording disk for centering same with respect to the drive hub and the clamp, and in a clamping portion for clamping the rcording disk against the disk bearing surface of the drive hub, the body portion and each clamp segment each having top ends that are substantially coplanar, each clamp segment further including a deflectable bridge portion joining the associated centering and clamping portions to the body portion, each deflectable bridge portion being arched in shape as seen in a radial plane of the clamp and being wholly disposed beneath the plane containing the top ends of the body portion and clamp segments, whereby the centering and clamping portions of the clamp segments are individually resiliently displaceable relative to the body portion for firmly clamping the recording disk against the disk bearing surface of the drive hub; and
   (c) means for moving the clamp into and out of engagement with the drive hub for clamping and unclamping the recording disk.

2. The disk centering and clamping apparatus as set forth in claim 1, wherein the centering portions of the clamp segments are arranged annularly about the second axis, each having a sloping outer surface locatd closer to the drive hub, and a nonsloping outer surface extending from the sloping outer surface in a direction away from the drive hub, whereby the centering portions as a whole have a tapered portion defined by the sloping outer surfaces and a cylindrical portion defined by the nonsloping outer surfaces.

3. The disk centering and clamping apparatus as set forth in claim 1, wherein the clamping portion of each clamp segment comprises a tab protruding radially outwardly from that axial end of the associated centering portion which is away from the drive hub.

4. The disk centering and clamping apparatus as set forth in clalim 3, wherein each tab has at least one protuberance formed thereon for pressing the recording disk against the disk bearing surface of the drive hub.

5. The disk centering and clamping apparatus as set forth in claim 1, wherein the centering portions of the clamp segments have top ends disposed in a plane substantially perpendicular to the axis of the drive hub and coplanar with the top end of the body portion of the clamp, and wherein the deflectable bridge portions of the clmp segments extend between the top end of the body portion and the top ends of the centering portions.

6. The disk centring and clamping apparatus as set forth in claim 5, wherein the clamping portion of each clamp segment comprises a tab extending radially outwardly from the top end of the associated centering portion and disposed approximately in coplanar relation to the associated deflectable bridge portion.

* * * * *